June 6, 1933.  H. HUEBER ET AL  1,913,308

WINDSHIELD CLEANER

Filed Sept. 18, 1930

Inventors
Henry Hueber
Erwin C. Horton
By Barton A. Bean Jr.
Attorney

Patented June 6, 1933

1,913,308

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

WINDSHIELD CLEANER

Application filed September 18, 1930. Serial No. 482,848.

This invention relates to automobile windshield cleaners and particularly to cleaners of the suction-operated type which have a plurality of wiping blades mounted for wiping movement over portions of the vehicle windshield.

Automobiles are commonly equipped with windshield cleaners comprising small motors operable by suction created in the engine manifold, attached to the vehicle header bars immediately above the windshield, and wiper blades extending over the windshield and adapted to be reciprocated or oscillated over the portion of the windshield by the motor. On larger vehicles, such as trucks, it is desirable to provide a plurality of such wiper blades so that a larger area of the windshield may be cleaned and a larger field of clear vision for the vehicle operator maintained at all times. Heretofore, this has ben accomplished by separately mounting a plurality of wiper blades above the windshield, one of the blades being directly associated with an actuating motor, and the remaining blade or blades operably mounted to the one wiper blade or motor by small rods or the like.

The present invention contemplates a windshield cleaner having a plurality of blades suitably supported at widely spaced points by a single casing, the latter being adapted to extend a substantial distance across the vehicle header bar and to be mounted thereon as a unit. The wiper blades depend from points adjacent the ends of the casing and may be simultaneously reciprocated by means in the casing in order that a large surface of the windshield may be cleaned at each stroke of the device. This simultaneous actuation of the blades is brought about by associating both blades with a single rod extending longitudinally through the casing and adapted to be reciprocated therein by suction means. Such a rod must be of considerable length, approximately slightly more than half the width of the windshield to provide proper spacing of the wiper blade, and since it is desirable that the rod be of small diameter to permit of light construction of the whole unit, it is an important desideratum of the invention to so adapt suction means as to effect only tensional stresses in the rod, in order to eliminate such possible buckling and bending of the rod as might occur if compressional stresses were applied.

These and other objects and advantages will become apparent from a perusal of the following description of a typical device embodying the principle of the invention, reference being made to the accompanying drawing wherein:—

Figure 1:
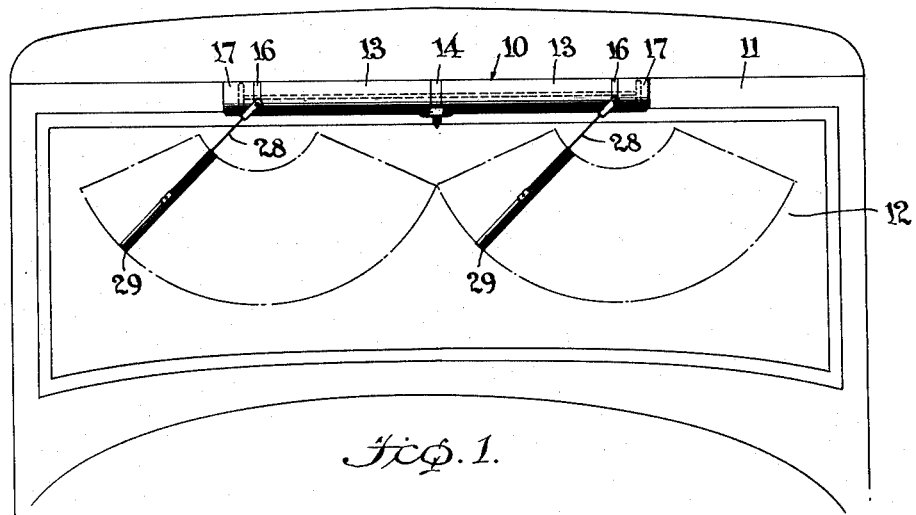
Fig. 1 is a front elevation of a portion of a motor vehicle showing the windshield cleaner of the present invention mounted on the header bar above the vehicle windshield.
Figure 2:
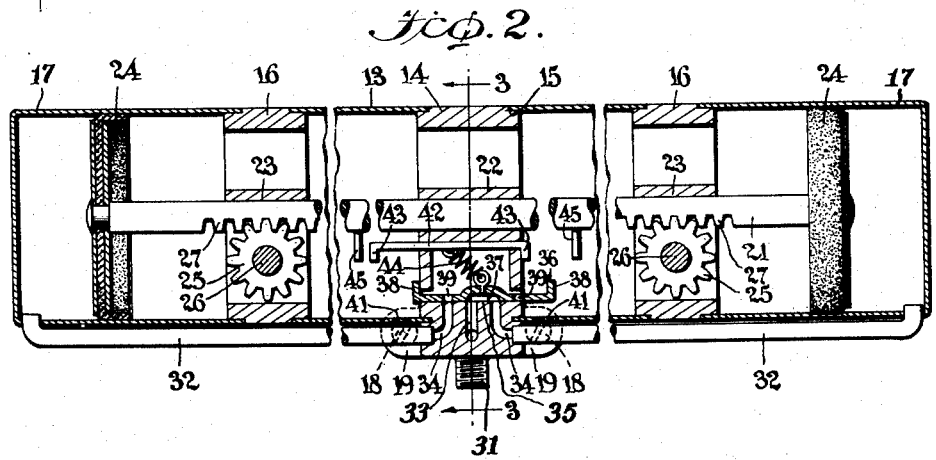
Fig. 2 is a longitudinal vertical section taken through the cleaner shown in Fig. 1.
Figure 3:
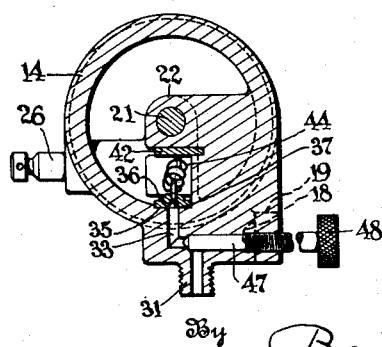
Fig. 3 is a transverse vertical section taken on line 3—3 of Fig. 2.

As shown in Figs. 1 and 2, the cleaner comprising a casing portion indicated generally at 10, is mounted upon the header bar 11 of an automotive vehicle immediately above the windshield 12 thereof. The casing comprises an elongated body portion formed of tubular sleeves 13 of light metal, joined together by a central or valve casting 14, the ends of the casting being annularly recessed, as indicated at 15, to telescopically receive the sleeves 13. Similarly recessed lateral or rock arm castings 16, forming the terminal portions of the body, are provided at the ends of the sleeves 13, and light metal cylinders 17 of diameters equal to that of the castings and the sleeves 13 are fitted over the annularly recessed outer ends of these castings 16. The whole casing comprising the central and lateral castings, sleeves, and cylinders, is secured to the header bar 11 by means of screws 18 which are passed through lugs 19, formed on the central or valve casting 14, and into the header bar 11.

A light metal rod 21 extends axially through the casing, being supported by a guide or bearing 22 formed in the central casting 14 and by similar bearing portions 23 formed in the lateral castings 16. Pistons 24 are secured to the ends of the rod 21 and are adapted to reciprocate in the cylinders 17 carrying with them the rod 21, portions of the latter adjacent the lateral castings 16 being cut away to form depending rack teeth 27 for meshing engagement with pinions 25, which are affixed to rock shafts 26 journalled in the castings 16. Each rock shaft projects outwardly of the casing and is adapted to carry a conventional wiper arm 28 which supports and carries a wiper blade 29.

The central casting 14 is provided with a nipple 31 which may be connected to a suction line communicating with the intake manifold of the vehicle engine and valve means are provided in the casting to alternately open and close communication between the suction line and pipes 32 which extend from the casing 14 to the outer ends of the opposed cylinders so that suction may alternately be applied to the outer faces or ends of the pinions 24, for reciprocating them axially of the casing and thus moving the rod 21 to effect angular movement or partial rotation of the pinions 25 and rock shafts 26 which carry the wiper blades 29. This valve mechanism comprises a port 33, extending from the nipple 31 and termed the supply port, and a pair of ports 34 communicating with the tubes 32, the ends of the ports opening into the valve face 35. The ports 34, each in open communication with one of the cylinders, are adapted to be alternately opened and closed to the port 33 by a sliding valve 36 provided with a recess 37 centrally thereof, which, within the limits of the valve movement is always open to the port 33, and which is of such length as to extend over only one or the other of the ports 34. Stop lugs 38 are formed on the ends of the valve to abut the side edges of the casting 14 for limiting the movement of the valve. Openings 39 are formed in the valve 36 at either side of the recess 37 to open the port 34 which is not in communication with the port 33 to the casing interior and ports 41 are formed in the sleeve members 13 so that the interior of the casing is open to the air under atmospheric pressure, thus allowing a condition of atmospheric pressure to maintain in one cylinder while the other cylinder is in communication with the suction line.

A trigger 42, having downwardly turned ends 43 to limit its sliding movement by abutment with the casting side walls, is mounted on the casting above the valve 36. A compression spring 44 has its ends attached to projections on the medial portion of the valve and the trigger 42, so that when the trigger is moved in one direction, the valve will, as the trigger center is moved over the center of the valve, be moved in the opposite direction. Pins 45, or other depending projections, are formed on the rod 17 and are adapted to abut the end 43 of the trigger.

It will now be understood that when the parts are in the position shown in Fig. 2, and the piston and the rod 21 are being moved toward the right, the pins 45 at the left will at the approximate limit of such movement abut the trigger end 43, moving the trigger with the piston until the center of the trigger passes over and slightly beyond the center of the valve, at which time the compression of the spring 44 will force the valve to the left, the trigger being retained with its right lug 43 in engagement with the wall of the casting 14. A condition of suction will thereby be caused to maintain in the left cylinder 17 and be effective upon the outer face of the left piston 24, while atmospheric pressure will maintain in the right cylinder and against the inner face of the left piston 24 and will press the latter outwardly forcing it and the rod to the left. When the piston reaches approximately the limit of its movement toward the left, the right pin 45 will abut the adjacent end of the trigger, forcing the valve in the opposite direction, or to the position shown in Fig. 2 so that the piston and rod will again be moved toward the right. A valve 47, threaded into the casting 14, is adapted to close the suction port 33, being actuated by rotation of the knurled adjusting head 48 formed on the outer end of the valve stem. As the speed of operation of the cleaner is dependent upon a quantity of air drawn through the suction port 33, and as the valve 47 may be adjusted to vary the opening in the inlet port the speed of operation may be conveniently controlled by turning the head 48.

It will be noted that while in movement each piston is at all times acted upon by atmospheric pressure applied to its inner face which forces the piston in the cylinder of less than atmospheric pressure outwardly toward the cylinder head, and that upon reaching its limit of movement, the opposing piston will be similarly acted upon so that the forces upon the rod 21, opposed by the resistance of the wiper blades and rock shafts, are always tensional. For this reason the rod 21 although it is very light and of comparatively great length, will have no tendency to buckle, as would be the case if compressional forces were applied to it.

It will thus be understood that the present invention provides a light and durable cleaner assembly wherein a plurality of wiper arms are mounted for automatic reciprocation over widely extending portions of the windshield area. The device being of light weight and of unitary construction, may be readily attached for support to the vehicle by means of the screws 18 passed in the header bar through the lugs 19 on central casting 14. It will further be understood that the device herein described is merely illustrative of the principles of the invention which is intended to be of scope commensurate with that of the appended claims.

What is claimed is:

A windshield cleaner comprising an elongated body member having cylinders at the ends thereof, a piston mounted for reciprocation in each of said cylinders, a light elongated rod extending concentrically of and between said cylinders and connecting said pistons, a pair of widely spaced rock shafts journalled in said body member between said pistons, one rock shaft being disposed adjacent each piston, means for each rock shaft associating said rod and each of the rock shafts whereby reciprocation of said rod will effect angular reciprocation of the rock shafts, means for applying suction alternately to the outer side of one and then the other of said pistons and simultaneously allowing fluid under atmospheric pressure to maintain against the inner side of said one of said pistons and against both sides of the other piston, whereby said rod will be reciprocated by forces always acting in tension to prevent buckling of said rod.

HENRY HUEBER.
ERWIN C. HORTON.